April 26, 1927.

R. W. ROST

PLAYING BALL

Filed Feb. 12, 1925

1,626,302

INVENTOR
Robert W. Rost.
BY
Harold D. Penny ATTORNEY

Patented Apr. 26, 1927.

1,626,302

UNITED STATES PATENT OFFICE.

ROBERT W. ROST, OF NEWARK, NEW JERSEY, ASSIGNOR OF ONE-HALF TO ANDREW F. BIGGER, OF NEW YORK, N. Y.

PLAYING BALL.

Application filed February 12, 1925. Serial No. 8,857.

This invention relates to resilient balls, particularly golf balls, and their method of manufacture, though it is noted that the invention is not limited to golf balls nor in some respects even to balls.

One object of the invention is to provide a golf or other ball and its method of manufacture, whereby the ball will be more resilient and have better driving ability than balls heretofore in use.

Another object of the invention is to provide a ball of this kind which is very resistant to deterioration, and which has great lasting qualities.

Another object of the invention is to provide a ball of this kind which may be larger than other balls of the same weight and carrying power, or which will have greater carrying power than other balls of the same weight or size.

Other objects of the invention are to improve generally the simplicity and efficiency of such balls and the method of manufacture and to provide a ball of this kind which is durable in use, economical to manufacture and which will remain practically free of deterioration with age.

Still other objects of the invention will appear as the description proceeds; and while herein details of the invention are described, the invention is not limited to these since many and various changes may be made without departing from the scope of the invention as claimed.

The inventive features for the accomplishment of these and other objects are shown herein in connection with an improved golf ball which, briefly stated, includes a core comprising tensioned windings consisting of strips of unvulcanized crepe rubber and a cover of balata over said core.

Figure 1:
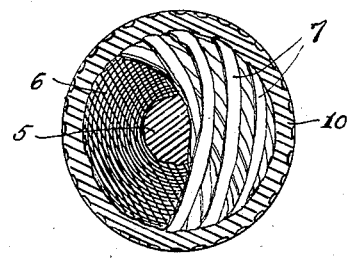
Figure 2:
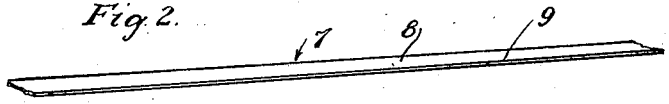

In the accompanying drawing showing by way of example one of many possible embodiments of the invention, Fig. 1 is a central sectional view of the ball; and Fig. 2 is a fragmental perspective view showing the strips.

The ball as shown includes a solid center 5 of crepe rubber coagulum or any usual metal or material; though it is particularly noted that the invention is in no way limited to the presence or absence of this center. The core 6 is wound about the center, if a center is used, or upon its own initial windings if the center is not used. The windings are wound under tension and are made of thin strips 7 of unvulcanized coagulated rubber latex hereinafter called coagulum or crepe rubber. These strips are substantialy proof against deterioration and are made by cutting up slabs or blocks of cast coagulum into sheets and then into strips, which thus have substantially all cut surfaces 8 and 9 free of crust and are very tough and elastic. A cover of pressed balata 10 covers and is secured over said core.

The ball may be made in various ways, and a suitable method includes winding the strips 7 of crepe rubber about the center, under tension, the inherent cohesion of the strips causing them to cohere firmly, and placing hemispherical sections of the balata cover around said core and then fixing them to the core under the influence of heat and the pressure of a mold.

A simple method of manufacturing the sheets of coagulum from which the strips may be cut is described in my co-pending application Serial No. 8858, filed Feb. 12, 1925, for method of manufacture of coagulum rubber articles and is here only briefly described.

This method includes casting a slab or block of crepe rubber, or coagulum, and feeding said slab into a leather splitting machine against a longitudinally continuously moving knife. The slab, as it is fed, is split to form tough elastic layers or sheets of the desired thickness, water being applied to the active edge of the knife to facilitate the cutting. The inner layers or sheets, being free of crust, are tough, very elastic and also foraminous and substantially pervious to air, and are cut into strips to form the windings 7.

The golf ball as above described has been found to be very elastic and efficient. By test, a ball having a core of the coagulum strips as stated has been found to rise 20 per cent higher on the rebound than a well known golf ball, now on the market, with which it was compared.

I claim:

1. A playing ball having a core of tensioned windings of thin strips of unvulcanized coagulum rubber inherently cohered.

2. A playing ball including tensioned windings of thin strips of unvulcanized coagulum rubber inherently cohered, the strips having substantially all cut surfaces.

3. A playing ball including tensioned windings of thin strips of unvulcanized, foraminous, substantially pervious to air coagulum rubber inherently cohered.

4. A playing ball including tensioned windings of thin strips of unvulcanized, foraminous, substantially pervious to air coagulum rubber inherently cohered, the strips having substantially all cut surfaces.

5. A playing ball having a center, and a core around said center consisting of tensioned windings of unvulcanized coagulum rubber inherently cohered.

6. A playing ball having a center, a core around said center consisting of tensioned windings of unvulcanized coagulum rubber inherently cohered and having substantially all cut surfaces, and a cover secured over said core.

7. A playing ball having a center, a core around said center consisting of tensioned windings of narrow strips of thin unvulcanized coagulum rubber inherently cohered and having substantially all cut surfaces, and a cover secured over said core.

8. A playing ball having a center, a core around said center consisting of tensioned windings of narrow strips of thin unvulcanized, foraminous, substantially pervious to air coagulum rubber inherently cohered and having substantially all cut surfaces, and a cover secured over said core.

Signed at New York in the county of New York and State of New York this 11th day of February, A. D. 1925.

ROBERT W. ROST.